US007626359B2

(12) United States Patent  (10) Patent No.: US 7,626,359 B2
Imai  (45) Date of Patent: Dec. 1, 2009

(54) APPARATUS AND METHOD FOR CHARGING AND DISCHARGING SERIALLY-CONNECTED BATTERIES

(75) Inventor: Takashi Imai, Kyoto (JP)

(73) Assignees: IKS Co., Ltd, Kyoto (JP); IKS USA, Inc., Charlotte, NC (US)

( * ) Notice: Subject to any disclaimer, the term of this patent is extended or adjusted under 35 U.S.C. 154(b) by 115 days.

(21) Appl. No.: 11/876,797

(22) Filed: Oct. 23, 2007

(65) Prior Publication Data

US 2009/0102421 A1   Apr. 23, 2009

(51) Int. Cl.
*H02J 7/00*   (2006.01)
(52) U.S. Cl. .................. 320/122; 320/116; 320/134
(58) Field of Classification Search .................. 320/116, 320/118–120, 122, 134
See application file for complete search history.

(56) References Cited

U.S. PATENT DOCUMENTS

| 5,952,815 | A | * | 9/1999 | Rouillard et al. ............ 320/116 |
| 6,239,580 | B1 | | 5/2001 | Toya |
| 6,373,226 | B1 | | 4/2002 | Itou et al. |
| 6,838,857 | B2 | | 1/2005 | Faure et al. |
| 2002/0011820 | A1 | | 1/2002 | Suzuki et al. |

FOREIGN PATENT DOCUMENTS

| EP | 0 851 556 A | 7/1998 |
| EP | 1 641 099 A | 3/2006 |
| GB | 2 313 497 A | 11/1997 |
| WO | WO 99/05767 A | 2/1999 |
| WO | WO 02/067281 | 8/2002 |
| WO | WO 2007/128876 A1 | 11/2007 |

OTHER PUBLICATIONS

International Search Report for International Application No. PCT/US2008/080599.

* cited by examiner

*Primary Examiner*—Edward Tso
*Assistant Examiner*—Ramy Ramadan
(74) *Attorney, Agent, or Firm*—Alston & Bird LLP

(57) ABSTRACT

An apparatus is provided that includes a plurality of serially-connected bypass circuits, a measurement/control element and a plurality of safety circuits. The bypass circuits are electrically connectable in parallel with a plurality of serially-connected batteries, each bypass circuit being connectable in parallel with a respective battery. The measurement/control element is electrically connected to the bypass circuits, and electrically connectable to the batteries; and the safety circuits are electrically connected to the measurement/control element, and electrically connectable between the measurement/control element and the batteries. The measurement/control element is configured to measure voltages across the respective batteries and, based on the voltages, selectively operate the bypass circuits to divert electrical current to or from the batteries through the respective bypass circuits. And each safety circuit is configured to limit current flow to the measurement/control element.

16 Claims, 6 Drawing Sheets

APPARATUS AND METHOD FOR CHARGING AND DISCHARGING SERIALLY-CONNECTED BATTERIES

FIELD OF THE INVENTION

Embodiments of the present invention generally relate to charging and discharging batteries, and more particularly, relate to charging and discharging a plurality of electrically-connected batteries in a battery pack.

BACKGROUND OF THE INVENTION

Rechargeable batteries are widely used in many industries, and generally include a group of two or more secondary cells (or secondary batteries). Generally, rechargeable batteries, such as Lithium, Nickel, lead-acid, flow type batteries or the like, can be restored to a full or near-full charge by the application of electrical energy. More particularly, the secondary cells or batteries of a rechargeable battery may be charged for collective use of their constant electrical current (CC-charge) and/or constant electrical voltage (CV-charge). In this manner, the maximum voltage of the battery may be controlled to prevent or otherwise reduce any danger due to a high-voltage condition. Further, by charging the batteries for collective use of their CC-charge and/or CV-charge, the secondary batteries may be charged in a shorter time period.

A number of conventional techniques exist for charging a plurality of electrically-connected batteries. As indicated above, it is generally desirable to fully or nearly-fully charge a rechargeable battery, or more particularly its secondary cells or batteries, in a fast and accurate manner. Thus, it may be desirable to monitor a secondary battery during its discharge to know when to begin recharging its secondary cells or batteries. It may also be desirable to monitor the secondary battery during its charge to know when to stop applying electrical energy to charge the batteries, such as to facilitate a full or near-full charge of its secondary batteries without overcharging the secondary batteries and thereby increasing the likelihood of damaging the rechargeable battery. In this regard, it may further be desirable to provide increased safety in charging the secondary cells or batteries of a rechargeable battery, to thereby reduce the likelihood of damage to the rechargeable battery and/or other damage that may be caused thereby.

SUMMARY OF THE INVENTION

In light of the foregoing background, exemplary embodiments of the present invention provide an improved apparatus and method for charging and/or discharging a plurality of serially-connected batteries. According to one aspect of exemplary embodiments of the present invention, an apparatus is provided that includes a plurality of serially-connected bypass circuits, a measurement/control element and a plurality of safety circuits. The bypass circuits are electrically connectable in parallel with a plurality of serially-connected batteries, each bypass circuit being connectable in parallel with a respective battery. The measurement/control element is electrically connected to the bypass circuits, and electrically connectable to the batteries; and the safety circuits are electrically connected to the measurement/control element, and electrically connectable between the measurement/control element and the batteries. The measurement/control element is configured to measure voltages across the respective batteries and, based on the voltages, selectively operate the bypass circuits to divert electrical current to or from the batteries through the respective bypass circuits. And each safety circuit is configured to limit current flow to the measurement/control element.

The measurement/control element may be configured to measure voltages across the respective batteries as electrical current is applied to the batteries to thereby charge the batteries. In such instances, when a voltage across one of the batteries reaches an upper voltage threshold, the measurement/control element may be configured to operate the bypass circuit in parallel with the respective battery to divert electrical current to the respective battery through the respective bypass circuit. The current may then be diverted until the voltage across the respective battery decreases below a lower voltage threshold.

The measurement/control element may be configured to measure voltages across the respective batteries as a charging circuit applies a first electrical current to the batteries to thereby charge the batteries. In these instances, when the voltage across one or more of the batteries reaches or exceeds a particular voltage, the measurement/control element may be configured to control the charging circuit to change the first electrical current to a second, smaller electrical current.

The measurement/control element may be configured to measure voltages across the respective batteries as a charging circuit applies electrical current to the batteries to thereby charge the batteries. Also, each bypass circuit may include a resistor and a switch. And in these instances, the resistance of the resistor of each bypass circuit may be set such that a product of the resistance and the electrical current is approximately equal to or greater than a final charging voltage of the battery in parallel with the respective bypass circuit.

The measurement/control element may be configured to measure voltages across the respective batteries as electrical current is drawn from the batteries to thereby discharge the batteries. In such instances, when a voltage across one of the batteries reaches a first lower voltage threshold, the measurement/control element may be configured to operate the bypass circuits to divert electrical current from the respective battery through the bypass circuits. In addition, the measurement/control element may be configured to operate a bypass circuit to divert electrical current from the respective battery through the respective bypass circuit until the voltage across the battery in parallel with the respective bypass circuit reaches a second lower voltage threshold.

The measurement/control element may be configured to measure voltages across the respective batteries as a discharging circuit draws a first electrical current from the batteries to thereby discharge the batteries. Thus, when a voltage across one of the batteries reaches a first lower voltage threshold, the measurement/control element may be configured to operate the bypass circuits to divert electrical current from the respective battery through the bypass circuit, and may be configured to control the discharging circuit to change the first electrical current to a second, smaller electrical current.

According to other aspects of the present invention, a method is provided. Embodiments of the present invention therefore provide an improved apparatus and method for charging and/or discharging a plurality of serially-connected batteries. As indicated above, and explained below, exemplary embodiments of the present invention may solve problems identified by prior techniques and provide additional advantages.

BRIEF DESCRIPTION OF THE DRAWINGS

Figure 1:
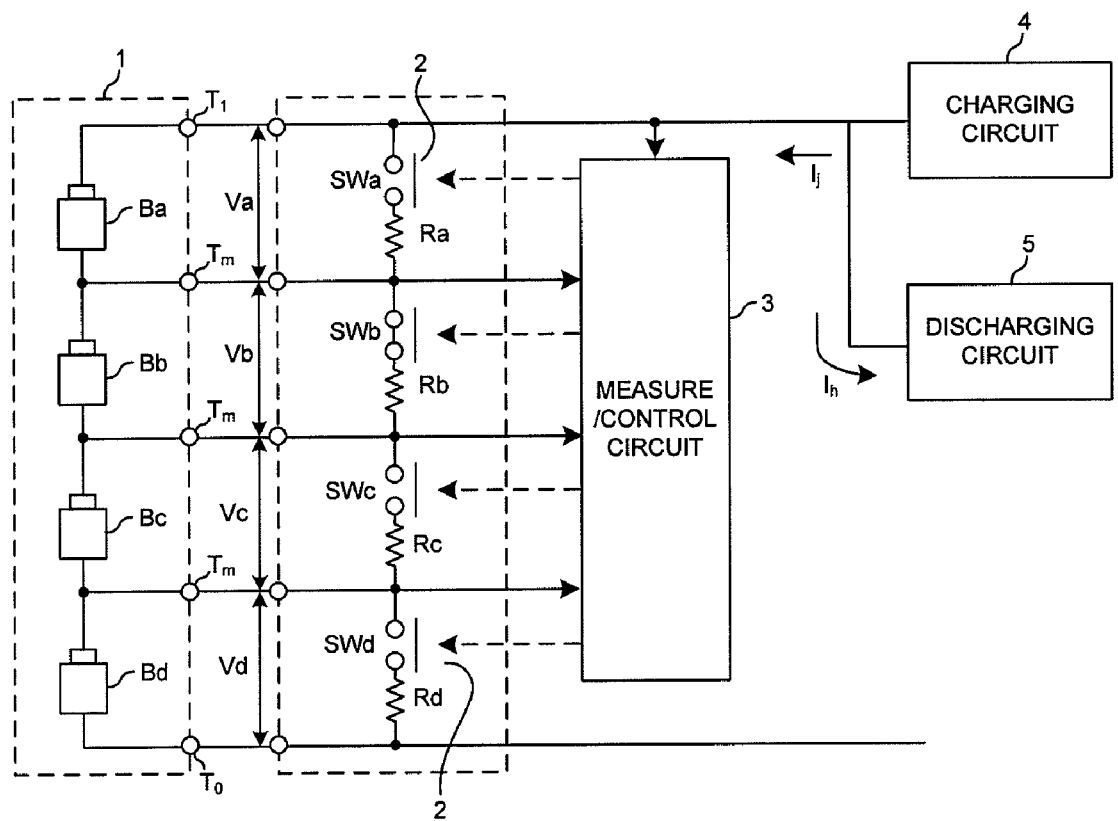
Figure 2:
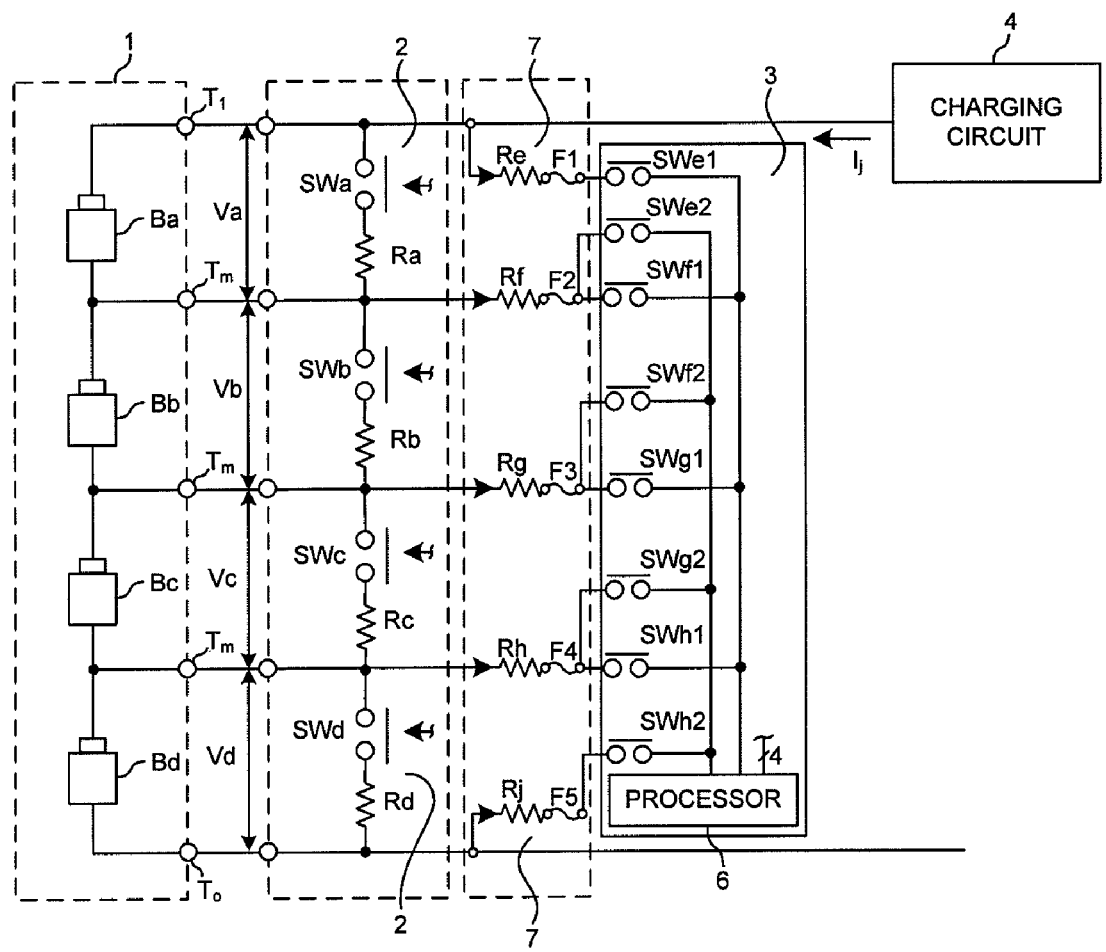
Figure 3:
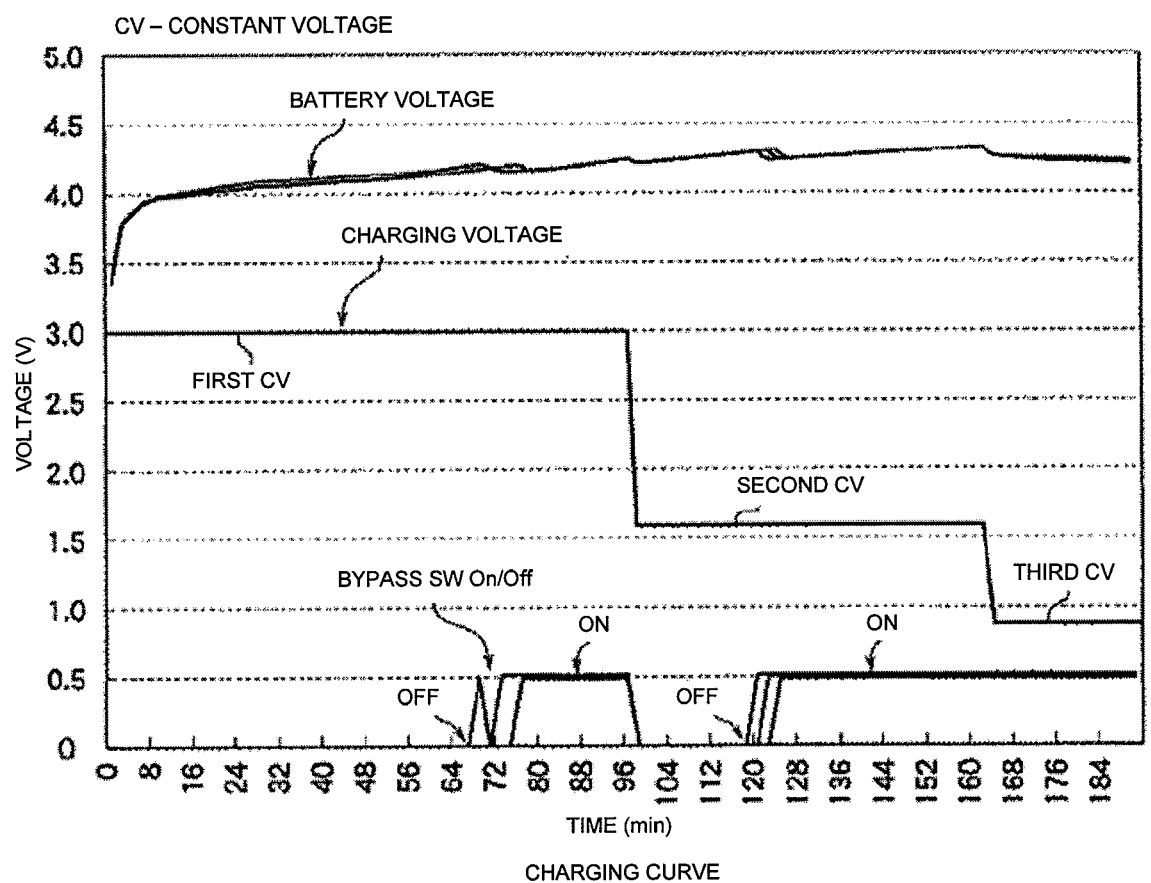
Figure 4:
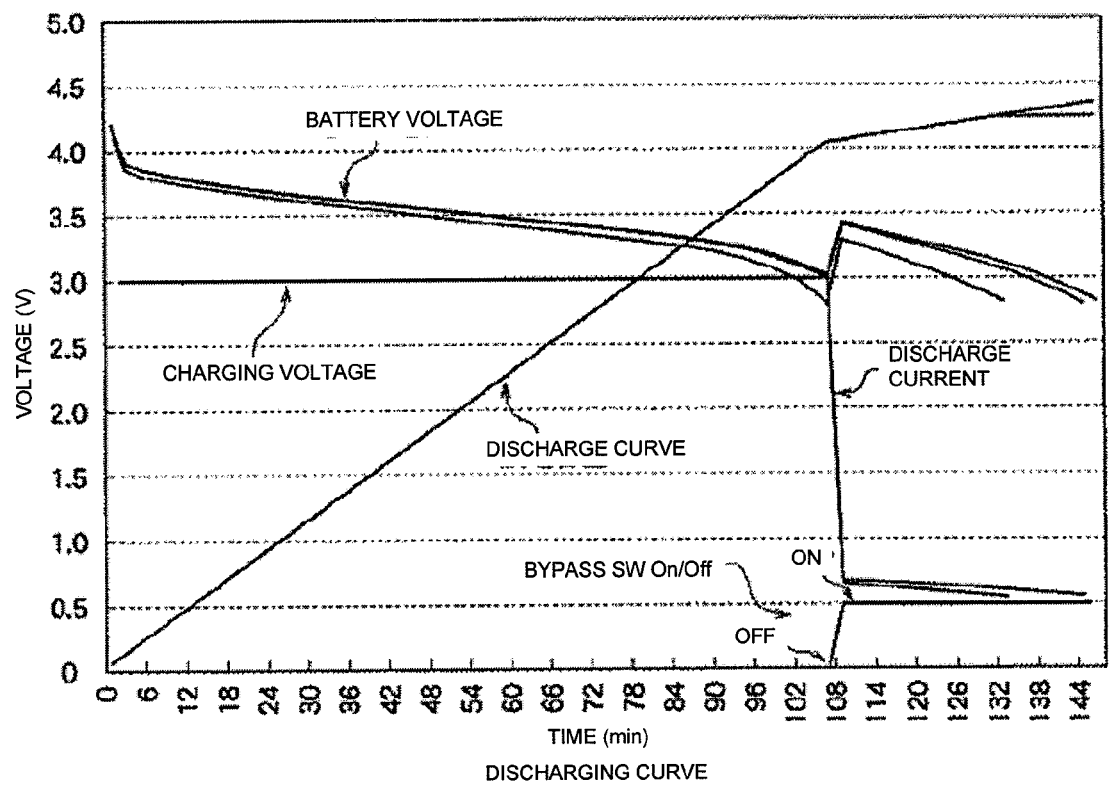
Figure 5:
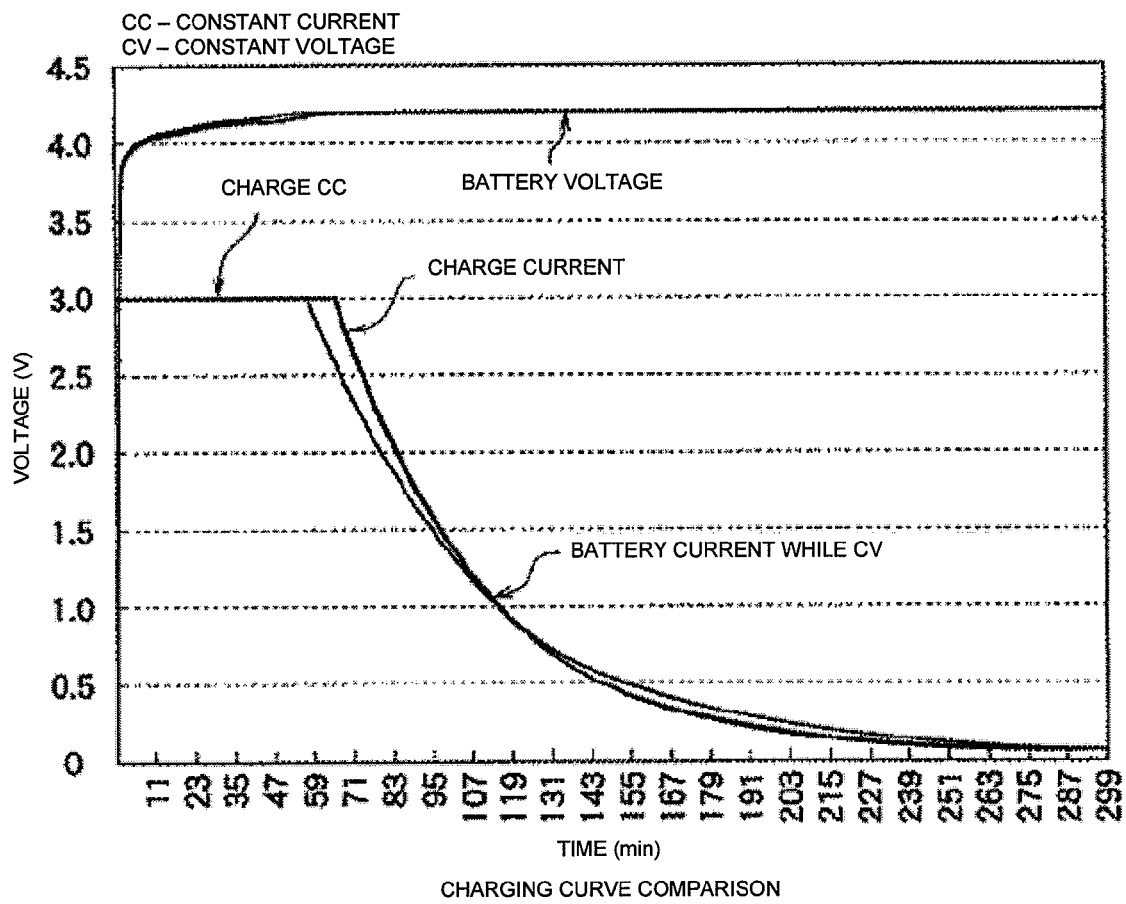
Figure 6:
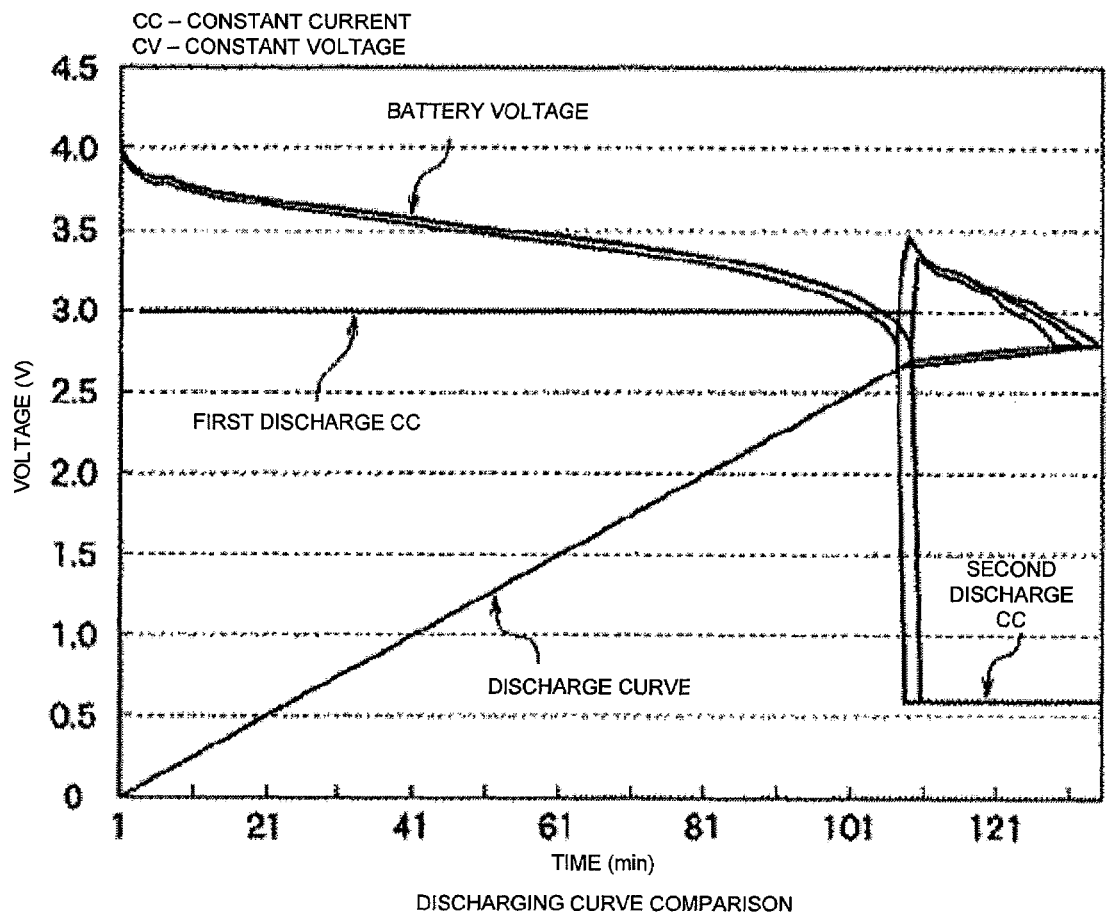

Having thus described the invention in general terms, reference will now be made to the accompanying drawings, which are not necessarily drawn to scale, and wherein:

FIG. 1 is a block diagram of charging/discharging equipment, according to one exemplary embodiment of the present invention;

FIG. 2 is another block diagram of charging/discharging equipment, according to one exemplary embodiment of the present invention;

FIG. 3 is a graph illustrating various aspects of charging batteries, according to one exemplary embodiment of the present invention;

FIG. 4 is a graph illustrating various aspects of discharging batteries, according to one exemplary embodiment of the present invention;

FIG. 5 is a graph illustrating various aspects of a charging curve comparison, according to one exemplary embodiment of the present invention; and FIG. 6 is a graph illustrating various aspects of a discharging curve comparison.

DETAILED DESCRIPTION OF THE INVENTION

The present invention now will be described more fully hereinafter with reference to the accompanying drawings, in which preferred embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

In accordance with exemplary embodiments of the present invention, charging equipment for secondary batteries or discharging equipment for secondary batteries (referred to herein as "charging/discharging equipment") may be configured to charge and/or discharge serially-connected secondary batteries. As shown in FIG. 1, for example, the charging/discharging equipment includes a battery pack 1 with a plurality of serially-connected, secondary batteries (cells) Ba-Bd. The battery pack includes main terminals $T_1$ and $T_0$ that are located at each of two ends of the serially-connected battery pack, and further includes one or more intermediate terminal $T_m$ each of which is electrically connected between a pair of secondary batteries Ba-Bd. Exemplary embodiments of the present invention may be described with reference to Lithium Ion secondary batteries. It should be understood, however, that the secondary batteries may comprise any of a number of other types of batteries.

The charging/discharging equipment further includes a plurality of bypass circuits 2 (e.g., one for each battery), a measurement/control element 3, a charging circuit 4 and a discharging circuit 5. The bypass circuits 2 are electrically connected in series with one another, and are each electrically connected in parallel with a respective secondary battery. Each bypass circuit may include a resister Ra-Rd connected in series with a respective switch SWa-SWd. A first bypass circuit is electrically connected to a first battery Ba via main terminal $T_1$ and an intermediary terminal $T_m$. Similarly, a last bypass circuit is electrically connected to a last battery Bd via an intermediary terminal $T_m$ and main terminal $T_0$. And any additional bypass circuits are electrically connected to any additional batteries (Bb and Bc) via intermediary terminals $T_m$.

As explained below, the measurement/control element 3 may include a series of switches and a processor or other controller, and may be configured to measure electrical voltage Va-Vd across each of the secondary batteries Ba-Bd, and control the switches SWa-SWd of the bypass circuits 2. And as appropriate, the measurement/control element may control operation of the charging and discharging circuits 4 and 5. In this regard, the charging circuit may comprise a power source, and be configured to supply power between the main terminals $T_1$ and $T_0$ of the battery pack 1 to thereby charge the secondary batteries. The discharging circuit may comprise a power load, and be configured to receive power discharged from the battery pack between its main terminals.

In operation, a method of charging a battery pack 1 including serially-connected secondary batteries Ba-Bd may include applying a constant (or approximately constant) electrical current Ij from a charging circuit 4 through the battery pack 1 at its main terminals $T_1$ and $T_0$ simultaneously charge each of serially-connected secondary batteries. While charging, the measurement/control element 3 may measure the voltage Va-Vd across each of the secondary batteries. When the voltage of a particular secondary battery reaches an upper voltage threshold (e.g., approximately 4.2 volts in the case of one Lithium Ion secondary battery), the measurement/control element may control the switch SWa-SWd of the bypass circuit 2 in parallel with the respective battery in the ON position. By controlling the respective switch in the ON position, the electric current that charges the respective battery may be redirected through the respective bypass circuit (bypassing the respective battery), thereby slowing the rate of charging the respective battery. This bypassed electric current may generate a voltage across the resistor Ra-Rd of the respective bypass circuit. The constant electric current may then continue to continuously charge the remaining secondary batteries, and as a result, each of secondary batteries can be evenly charged.

When the voltage of the respective secondary battery Ba-Bd (the battery of which a respective bypass circuit's 2 switch SWa-SWd is in the ON position) decreases below a lower voltage threshold (e.g., approximately 4.16 volts in the case of one Lithium Ion secondary battery), the measurement/control element 3 may control the respective switch in the OFF position, to thereby again charge the respective battery. The lower voltage threshold may be set lower than the upper voltage threshold, and both may be set to account for electrical hysteresis while controlling the switch in its ON and OFF positions.

The aforementioned charging control process may similarly occur for each of the secondary batteries Ba-Bd of the battery pack 1. In this regard, the measurement/control element 3 may adjust the charging conditions of a secondary battery such that, during an initial charging of the battery or during a period of a quick drop in the charging voltage of the battery, the respective switch may be quickly controlled from the ON state to the OFF state, in which state the respective switch may remain relatively longer than in the previous ON state. When the charging process has progressed sufficiently enough that the charging condition becomes stable, however, the period during which the respective switch is controlled in its ON state may become longer.

After an initial charging process with constant electrical current, the charging/discharging equipment may proceed with a more accurate charging. In order to accomplish this more accurate charging, the measurement/control element 3 may control the charging circuit 4 to change the initially applied constant current (referred to as the "first" constant current) to a smaller electrical current (referred to as the "second" constant current); the charging process then continuing as before. As shown in FIG. 3 relative to the corresponding constant voltages (CVs), for example, the second constant current value may be less than (e.g., approximately one-half of) the first constant current. The change over from the first to the second constant current may be made, for example, when one of secondary batteries Ba-Bd reaches a change-over voltage, such as a value α above the upper voltage threshold (e.g., approximately 4.3 volts in the case of a Lithium Ion battery). Alternatively, for example, the timing of changing over may be made when all of the secondary batteries (all of the cells) reach or exceed the upper voltage threshold.

Regardless of when the change over to the second constant current is made, thereafter, the measurement/control element 3 may adjust the charging conditions of the batteries Ba-Bd of the battery pack 1 in a manner similar to when the first constant current is applied. That is, the measurement/control element may be configured to continue to measure the voltage Va-Vd across each of the secondary batteries, switching ON the bypass circuits 2 of those batteries whose voltage reaches the upper voltage threshold, and switching OFF the bypass circuits 2 of those batteries whose voltage decreases below the lower voltage threshold. By operating based on the second constant current in this case, however, the charging/discharging equipment may minimize the charging electrical current, and prevent a radical change in voltage of the batteries.

Similar to the case of changing over from a first constant current to a second constant current, if so desired, an even more detailed adjustment may be made by changing over to an even smaller electrical current (referred to as the "third" constant current), and the charging process may continue as before. Similar to the second constant current, the third constant current value may be less than (e.g., approximately one-third of) the first constant current, as shown in FIG. 3 (relative to the corresponding CVs), for example. The change over from the second to the third constant current may be made, for example, with timing similar to (but after) that of the change over from the first to the second constant current, where the respective voltage at which the change over occurs being the same or similar. Similar to before, after the change over from the second to the third constant current, the measurement/control element 3 may adjust the charging conditions of the batteries Ba-Bd of the battery pack 1. That is, the measurement/control element may be configured to continue to measure the voltage Va-Vd across each of the secondary batteries, switching ON the bypass circuits 2 of those batteries whose voltage reaches the upper voltage threshold, and switching OFF the bypass circuits 2 of those batteries whose voltage decreases below the lower voltage threshold.

While a bypass circuit 2 is ON (i.e., the switch SWa-SWd of a bypass circuit is in the ON position), and under the condition of almost completing the charging process of the respective secondary battery Ba-Bd, all of the secondary batteries of the battery pack 1 may be precisely charged if the voltage across the resistor Ra-Rd of the respective bypass circuit is approximately the same as the final charging voltage of the respective secondary battery. In this regard, the resistance of the respective resistor may be set such that the product of that value and the constant electrical current approximately equals the final charging voltage of the respective secondary battery. Moreover, if the product of the resistance of the respective resistor and the constant electrical current is slightly greater than the final charging voltage of the respective secondary battery, the time required to charge the respective secondary battery may be even further reduced. In this case, a significant portion of the constant electrical current flows through the respective bypass circuit while that circuit is ON.

As indicated above, the measurement/control element 3 may include a series of switches and a processor or other controller. The processor may include hardware and/or firmware, and may function alone and/or under control of software including computer-readable program code portions, which may be stored in a non-volatile and/or volatile storage medium (not shown). Now referring to FIG. 2, in one exemplary embodiment, the measurement/control element may include pairs of switches SWe-SWh and processor 6 (the control lines from the processor to switches SWa-SWd being truncated in FIG. 2 for illustrative purposes). The switches may comprise any of a number of different types of switches including, for example, semiconductor switches such as transistors or the like. In the configuration shown in FIG. 2, each pair of switches is associated with a secondary battery Ba-Bd, and thus a bypass circuit 2. In operation, then, the processor may be configured to switch a pair of switches ON, while the remaining pairs of switches are OFF, to thereby measure the voltage across a respective secondary battery. This pair of switches may then be switched OFF, and another pair of switches switched ON to measure the voltage across another respective secondary battery. In this manner, the pairs of switches may be switched ON and OFF serially or in some other manner to permit the processor to measure the voltage across respective secondary batteries.

In the configuration of FIG. 2, consider the case in which one or both of the switches SWe-SWh of two pairs of switches are simultaneously ON, such as due to a malfunction of the measurement/control element 3 or another cause. For example, consider the case in which switches SWe1 and SWf1 are simultaneously ON. This type of situation may arise, for example, during operation of the charging/discharging equipment in extreme temperature environments, i.e., low-temperature environments and/or high temperature environments, or as a result of unexpected voltage or current surges, latent defects in switch construction, etc. In such instances, the malfunction in the switches may cause further malfunction of the charging/discharging equipment, and may even cause damage to the batteries Ba-Bd themselves. More particularly, for example, simultaneously operating switches SWe1 and SWf1 in the ON state may result in an electrical current short-circuit between the positive (+) and negative (−) terminals of battery Ba passing through SWe1 and SWf1. This short circuit, then, may result in further malfunction of the charging/discharging equipment, or even damage to the batteries.

To reduce the likelihood of damaging the charging/discharging equipment, such as in the event of a malfunction of the switches of the measurement/control element 3, the charging/discharging equipment may further include safety circuits 7 in line with the paths by which current may pass through the measurement/control element. More particularly, a safety circuit may be electrically connected between the measurement/control element and each of the main terminals $T_1$ and $T_0$, and intermediate terminals $T_m$, of the battery pack 1 (these terminals being electrically connected to the positive (+) and negative (−) terminals of the batteries Ba-Bd in the battery pack).

The safety circuits are configured to limit current flow to the measurement/control element 3. In this regard, each of the safety circuits 7 may include a resistor Re-Rj (e.g., 2.2 Ohm resistor) and fuse F1-F5. These resistors may function to resist current that may otherwise pass from the batteries Ba-Bd to the measurement/control element 3, which in the event of a malfunction such as that described above, may constitute a short-circuit current. In this regard, the resisters may reduce the current that otherwise might pass to the measurement/control element to an acceptable level. When switches SWe1 and SWf1 are simultaneously operated in the ON state, for example, the short-circuit electrical current Isc may be calculated as Isc=Va/(Re+Rf), where Re and Rf represent the resistances of resistors Re and Rf (e.g., 2.2 Ohms for each of Re and Rf). In another example in which switches SWe1 and SWh1 are simultaneously operated in the ON state, for example, the short-circuit electrical current Isc may be calculated as Isc=(Va+Vb+Vc)/(Re+Rh), where Re and Rh represent the resistances of resistors Re and Rh (e.g., 2.2 Ohms for each of Re and Rh). Further, to the extent that the current a resistor Re-Rj passes is still above an acceptable level, the fuse F1-F5 of the respective safety circuit may be configured to open the respective path (i.e., create an open-circuit condition) to prevent current flowing across that path to the measurement/control element, thereby providing further protection for the measurement/control element. In this regard, the amperage of the fuse may be calculated as F=V/R×SF, where V represents an approximate maximum voltage that may be permitted across a respective battery (e.g., 4.2 volts in the case of a Lithium Ion battery), R represents the resistance of the resistor Re-Rj (e.g., 2.2 Ohms) in series with the respective fuse, and SF represents an appropriate safety factor (e.g., 1, 2.5, etc.).

The charging process shown and described herein includes changing over between three constant currents. It should be understood, however, that the process may change over between fewer than three constant currents, or more than three constant currents, if so desired. That is, for example, to provide even more control over charging of the secondary batteries Ba-Bd, the third constant current may be changed over to a fourth, smaller constant current; and the process may continue in a manner similar to before.

Turning now to discharging a battery pack 1, a method of discharging serially-connected secondary batteries Ba-Bd may include drawing a constant (or approximately constant) electrical current Ih (referred to as a "first" constant current) from the battery pack 1 at its main terminals $T_1$ and $T_0$ the discharging circuit 5 to thereby simultaneously discharge each of serially-connected secondary batteries Ba-Bd. While discharging the secondary batteries, the measurement/control element 3 may measure the voltage Va-Vd across each of the secondary batteries. When the voltage of a particular secondary battery reaches a first lower voltage threshold, the measurement/control element may control the switches SWa-SWd of the bypass circuits 2 in the ON position, as shown for example in FIG. 4. In addition, the measurement/control element may signal the discharging circuit 5 to shut down its draw of the constant electrical current.

Immediately after switching the bypass circuits 2 ON, the batteries respective internal conditions may be unstable (discharged condition). As shown in FIG. 4, for example, the voltage of the secondary batteries may momentarily, radically soar; after which, the discharge of the secondary batteries may gradually decrease. Meanwhile, if so desired, the current drawn from the battery pack 1 may be changed over from the first constant current to a second, smaller constant current. The measurement/control element 3 may continue to measure the voltage Va-Vd across each of the secondary batteries, and switch OFF any bypass circuit when the voltage across a respective secondary battery reaches a second lower voltage threshold. This second lower voltage threshold (e.g., approximately 2.8 volts in the case of a Lithium Ion secondary battery) may be approximately the same as, or lower than, the first lower voltage threshold value. In this way, the charging/discharging equipment may control switching the bypass circuits 2 ON and OFF, and continue discharging the secondary batteries Ba-Bd until the batteries respective internal conditions stabilize, and the discharging condition of each of the secondary batteries becomes uniform.

During discharge of the secondary batteries Ba-Bd of the battery pack 1, while a bypass circuit 2 is ON, electrical current may flow through the its respective resistor Ra-Rd. This electrical current, I, may be calculated according to Ohm's Law as I=V/R, where V represents the voltage across the resistor (approximating the voltage of the secondary battery in parallel with the respective bypass circuit), and R represents the resistance of the resistor. As shown in FIG. 4, discharging capacity may be represented by an increasing linear curve during the first constant current; and as such, discharging capacity may be easily determined. Then, when a bypass circuit is switched ON, the discharging electrical current may be easily calculated from the resistance of the respective resistor and voltage of the secondary battery in parallel with the respective bypass circuit. In this way, discharge capacity may be easily measured.

In one example scenario in which the secondary batteries Ba-Bd are Lithium Ion batteries, it may be desirable to control their maximum voltage since such batteries generally have a large internal impedance. In such instances, the charging/discharging equipment may charge the batteries according to a two-stage process whereby an initial charge is performed with a relatively large electrical current. Then, as the batteries approach a particular voltage, the charging may be changed over to a smaller electrical current to more particularly control the charged voltage of the batteries. In this scheme, the bypass circuits 2 may not be required during the first charging stage; and as such, the circuits may be constructed for smaller current tolerances, thereby permitting more compact electrical circuits.

Further, selecting resistors Ra-Rd (of the bypass circuits 2) with particular resistances, the charging/discharging equipment may charge the batteries with a constant voltage by only controlling the constant electrical current applied to the battery pack 1. This may make the charging process more efficient as compared to conventional techniques. At the same time, using the same resistors (with the same resistances) while discharging the batteries, the discharging may be accomplished with a relatively smaller electrically current, thereby permitting highly accurate charge/discharge control.

Moreover, although the battery pack 1 may require an appreciable electrical current to control the charging/discharging of its serially-connected batteries Ba-Bd, the bypass circuits 2 may only be required to pass a fraction of that current (e.g., ⅓-⅒ of the current applied to the battery pack). As such, the bypass circuits may be constructed in a more cost effective manner, as compared to conventional charging/discharging equipment that separately charge/discharge secondary batteries in parallel.

To illustrate exemplary embodiments of the present invention, consider an example whereby a battery pack 1 includes four serially-connected Lithium Ion secondary batteries Ba-Bd, and whereby each of the resistors Ra-Rd of the bypass circuits 2 in parallel with respective batteries has a resistance of 20 Ohms. To charge the batteries, a first constant current of approximately 750 milliamps is applied from the charging circuit 4 through the battery pack 1 at its main terminals $T_1$ and $T_0$. As the batteries charge, the measurement/control element 3 may measure the voltage across the secondary batteries and control the bypass circuits based on an upper voltage threshold of approximately 4.2 volts, and a lower voltage threshold of approximately 4.16 volts.

When one of secondary batteries Ba-Bd reaches a particular change-over voltage, or when all of the secondary batteries (all of the cells) reach or exceed the upper voltage threshold, the first constant current may be changed over to a second constant current of 400 milliamps. The charging process may then continue by applying the second constant current, and now based on a new upper voltage threshold of approximately 4.3 volts (the lower voltage threshold remaining at approximately 4.16 volts).

Again, when one of secondary batteries Ba-Bd reaches a particular change-over voltage, or when all of the secondary batteries (all of the cells) reach or exceed the new upper voltage threshold (approximately 4.3 volts), the second constant current may be changed over to a third constant current of 215 milliamps. The charging process may then continue by applying the third constant current, and now based on another upper voltage threshold of approximately 4.16 volts (the lower voltage threshold again remaining at approximately 4.16 volts).

Again consider the example whereby a battery pack 1 includes four serially-connected Lithium Ion secondary batteries Ba-Bd, and whereby each of the resistors Ra-Rd of the bypass circuits 2 in parallel with respective batteries has a resistance of 20 Ohms. To discharge the batteries, a first constant current of approximately 750 milliamps may be drawn from the battery pack 1 at its main terminals $T_1$ and $T_0$ the discharging circuit 5 to thereby simultaneously discharge each of serially-connected secondary batteries. As the batteries discharge, the measurement/control element 3 may measure the voltage across the secondary batteries and control the bypass circuits based on first and second lower voltage thresholds of approximately 2.8 volts. In this instance, the current through the resistors Ra-Rd of the bypass circuits 2 may be calculated as being between approximately 140 milliamps and approximately 160 milliamps.

To further illustrate exemplary embodiments of the present invention, reference is now made to FIGS. 5 and 6, which illustrate charging and discharging graphs, respectively, of conventional charging/discharging equipment whereby four Lithium Ion secondary batteries are individually, and separately, charged and discharged. As shown in FIG. 5, for example, the charging process for each battery may include first applying a constant electrical current of approximately 750 milliamps, and then applying a constant electrical voltage of approximately 4.2 volts. In this instance, each battery may be charged by decreasing the current through the respective battery. As shown in FIG. 6, for example, the discharging process for each battery may include drawing a first constant current of approximately 750 milliamps; then, when the voltage of the respective secondary battery reaches a lower voltage threshold of approximately 2.8 volts, the first constant current drawn from the battery may be changed over to a second constant current of 150 milliamps.

Table 1 below illustrates a comparison between the aforementioned example charging process according to exemplary embodiments of the present invention, and the example conventional charging process. In Table 1, the charging time refers to the time required to charge all of the batteries in the battery pack 1 up to a final charged voltage, which in this case may be approximately 4.2 volts. Open current voltage (OCV) may refer to the voltage of each battery after an initial thirty minute charge, and may be considered the stable charged voltage of the respective batteries. Discharging capacity ("Capacity") may refer to the total electrical current after the charging to a final voltage level of approximately 2.8 volts, and shows the total electrical current that may be drawn from the charged battery.

As shown in Table 1, exemplary embodiments of the present invention may earn a higher OCV value than the conventional technique, up to approximately 4.2 volts in this example. This demonstrates that exemplary embodiments of the present invention may permit a charge to a higher voltage level, and therefore a higher discharging capacity. As also shown, exemplary embodiments of the present invention may exhibit better charging characteristics, and with a shorter charging time (240 minutes compared to 300 minutes in this example).

TABLE 1

|  |  | Cell 1 | Cell 2 | Cell 3 | Cell 4 |
|---|---|---|---|---|---|
| Exemplary embodiments of invention | Charging Time (min) | 240 | 240 | 240 | 240 |
|  | OCV (30 min) | 4197 | 4195 | 4190 | 4172 |
|  | Capacity (mA) | 1452 | 1452 | 1450 | 1413 |
| Conventional system | Charging Time (min) | 300 | 300 | 300 | 300 |
|  | OCV (30 min) | 4186 | 4185 | 4186 | 4182 |
|  | Capacity (mA) | 1405 | 1398 | 1405 | 1393 |

The system and method of exemplary embodiments of the present invention therefore permit effective charging/discharging of serially-connected secondary batteries. The system and method of exemplary embodiments permit effective charging/discharging of such batteries with a reduced likelihood of damaging the charging/discharging equipment, such as in the event of a malfunction. In addition, the system and method of exemplary embodiments of the present invention permit lower-cost charging/discharging equipment.

Many modifications and other embodiments of the invention will come to mind to one skilled in the art to which this invention pertains having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

What is claimed is:

1. An apparatus comprising:

a plurality of serially-connected bypass circuits, the bypass circuits being electrically connectable in parallel with a plurality of serially-connected batteries, each bypass circuit being electrically connectable in parallel with a respective battery, wherein each of the batteries includes positive and negative terminals, the batteries including main terminals each of which is electrically connected to a respective one of the positive terminal of the first battery and the negative terminal of the second battery, and one or more intermediate terminals each of which is electrically connected between a respective pair of the batteries;

a measurement/control element electrically connected to the bypass circuits, and electrically connectable to the batteries, wherein the measurement/control element is configured to measure voltages across the respective batteries and, based on the voltages, selectively operate the bypass circuits to divert electrical current to or from the batteries through the respective bypass circuits; and a plurality of safety circuits electrically connected to the measurement/control element, and electrically connectable between the measurement/control element and the batteries, wherein the plurality of safety circuits includes a separate safety circuit for each of the main terminals and each of the one or more intermediate terminals, each safety circuit being electrically connectable in line between the measurement/control element and a respective main terminal or intermediate terminal, and wherein each safety circuit is configured to limit current flow to the measurement/control element.

2. An apparatus according to claim 1, wherein the measurement/control element is configured to measure voltages across the respective batteries as electrical current is applied to the batteries to thereby charge the batteries, wherein when a voltage across one of the batteries reaches an upper voltage threshold, the measurement/control element is configured to operate the bypass circuit in parallel with the respective battery to divert electrical current to the respective battery through the respective bypass circuit, the current being diverted until the voltage across the respective battery decreases below a lower voltage threshold.

3. An apparatus according to claim 1, wherein the measurement/control element is configured to measure voltages across the respective batteries as a charging circuit applies a first electrical current to the batteries to thereby charge the batteries, wherein when the voltage across one or more of the batteries reaches or exceeds a particular voltage, the measurement/control element is configured to control the charging circuit to change the first electrical current to a second, smaller electrical current.

4. An apparatus according to claim 1, wherein the measurement/control element is configured to measure voltages across the respective batteries as a charging circuit applies electrical current to the batteries to thereby charge the batteries, wherein each bypass circuit comprises a resistor and a switch, and wherein the resistance of the resistor of each bypass circuit is set such that a product of the resistance and the electrical current is approximately equal to or greater than a final charging voltage of the battery in parallel with the respective bypass circuit.

5. An apparatus according to claim 1, wherein the measurement/control element is configured to measure voltages across the respective batteries as electrical current is drawn from the batteries to thereby discharge the batteries, wherein when a voltage across one of the batteries reaches a first lower voltage threshold, the measurement/control element is configured to operate the bypass circuits to divert electrical current from the respective battery through the bypass circuits.

6. An apparatus according to claim 5, wherein the measurement/control element is configured to operate a bypass circuit to divert electrical current from the respective battery through the respective bypass circuit until the voltage across the battery in parallel with the respective bypass circuit reaches a second lower voltage threshold.

7. An apparatus according to claim 1, wherein the measurement/control element is configured to measure voltages across the respective batteries as a discharging circuit draws a first electrical current from the batteries to thereby discharge the batteries, wherein when a voltage across one of the batteries reaches a first lower voltage threshold, the measurement/control element is configured to operate the bypass circuits to divert electrical current from the respective battery through the bypass circuits, and configured to control the discharging circuit to change the first electrical current to a second, smaller electrical current.

8. A method comprising:

electrically connecting an apparatus in parallel with a plurality of serially-connected batteries, wherein each of the batteries includes positive and negative terminals, the batteries including main terminals each of which is electrically connected to a respective one of the positive terminal of the first battery and the negative terminal of the second battery, and one or more intermediate terminals each of which is electrically connected between a respective pair of the batteries, the apparatus comprising:

a plurality of serially-connected bypass circuits each of which is electrically connected in parallel with a respective battery, a measurement/control element, and a plurality of safety circuits electrically connected between the measurement/control element and the batteries, wherein the plurality of safety circuits includes a separate safety circuit for each of the main terminals and each of the one or more intermediate terminals, each safety circuit being electrically connectable in line between the measurement/control element and a respective main terminal or intermediate terminal, and;

measuring voltages across the respective batteries; and selectively operating the bypass circuits to divert electrical current to or from the batteries through the respective bypass circuits, the voltages being measured and the bypass circuits being selectively operated by the measurement/control element, wherein the method further comprises limiting current flow to the measurement/control element by the safety circuits, the current being limited as the voltages are measured and the bypass circuits are selectively operated.

9. A method according to claim 8, wherein measuring voltages comprises measuring voltages across the respective batteries as electrical current is applied to the batteries to thereby charge the batteries, wherein when a voltage across one of the batteries reaches an upper voltage threshold, selectively operating the bypass circuits comprises operating the bypass circuit in parallel with the respective battery to divert electrical current to the respective battery through the respective bypass circuit, the current being diverted until the voltage across the respective battery decreases below a lower voltage threshold.

10. A method according to claim 8, wherein measuring voltages comprises measuring voltages across the respective batteries as a charging circuit applies a first electrical current to the batteries to thereby charge the batteries, wherein when the voltage across one or more of the batteries reaches or exceeds a particular voltage, the method further comprises controlling the charging circuit to change the first electrical current to a second, smaller electrical current, the charging circuit being controlled by the measurement/control element.

11. A method according to claim 8, wherein measuring voltages comprises measuring voltages across the respective batteries as a charging circuit applies a first electrical current to the batteries to thereby charge the batteries, wherein each bypass circuit comprises a resistor and a switch, and wherein the method further comprises selecting the resistor of each bypass circuit such that a product of the resistance of the respective resistor and the electrical current is approximately equal to or greater than a final charging voltage of the battery in parallel with the respective bypass circuit.

12. A method according to 8, wherein measuring voltages comprises measuring voltages across the respective batteries as electrical current is drawn from the batteries to thereby discharge the batteries, wherein when a voltage across one of the batteries reaches a first lower voltage threshold, selectively operating the bypass circuits comprises operating the bypass circuits to divert electrical current from the respective battery through the bypass circuits.

13. A method according to claim 12, wherein operating the bypass circuits to divert electrical current includes operating a bypass circuit to divert electrical current from the respective battery through the respective bypass circuit until the voltage across the battery in parallel with the respective bypass circuit reaches a second lower voltage threshold.

14. A method according to claim 8, wherein measuring voltages comprises measuring voltages across the respective batteries as a discharging circuit draws a first electrical current from the batteries to thereby discharge the batteries, wherein when a voltage across one of the batteries reaches a first lower voltage threshold, selectively operating the bypass circuits comprises operating the bypass circuits to divert electrical current from the respective battery through the bypass circuits, and wherein when a voltage across one of the batteries reaches a first lower voltage threshold, the method further comprises controlling the discharging circuit to change the first electrical current to a second, smaller electrical current, the discharging circuit being controlled by the measurement/control element.

15. An apparatus according to claim 1, wherein the measurement/control element comprises a processor and a plurality of pairs of switches each of which is electrically connectable to the positive and negative terminals of a respective battery, and wherein for each battery, the measurement/control element being configured to measure a voltage across the battery includes being configured to selectively operate one or more of the pairs of switches such that the pair of switches to which the battery is electrically connectable is in an on state, and such that the remaining pairs of switches are in an off state.

16. A method according to claim 8, wherein the measurement/control element comprises a processor and a plurality of pairs of switches each of which is electrically connected to the positive and negative terminals of a respective battery, and wherein measuring voltages across the respective batteries includes, for each battery, selectively operating one or more of the pairs of switches such that the pair of switches to which the battery is electrically connected is in an on state, and such that the remaining pairs of switches are in an off state.

* * * * *

UNITED STATES PATENT AND TRADEMARK OFFICE
CERTIFICATE OF CORRECTION

PATENT NO. : 7,626,359 B2  Page 1 of 1
APPLICATION NO. : 11/876797
DATED : December 1, 2009
INVENTOR(S) : Imai It is certified that error appears in the above-identified patent and that said Letters Patent is hereby corrected as shown below:

Column 4,
Line 22, "$T_1$ and $T_0$ simultaneously" should read --$T_1$ and $T_0$ to simultaneously--.

Column 7,
Lines 44-45, "$T_1$ and $T_0$ the discharging" should read --$T_1$ and $T_0$ to the discharging--.

Column 9,
Lines 30-31, "$T_1$ and $T_0$ the discharging" should read --$T_1$ and $T_0$ to the discharging--.

Signed and Sealed this
Fourteenth Day of June, 2011

David J. Kappos
*Director of the United States Patent and Trademark Office*